Jan. 10, 1933.  F. S. MARCELLUS  1,894,109
TEMPERATURE MEASUREMENT
Filed Nov. 19, 1930
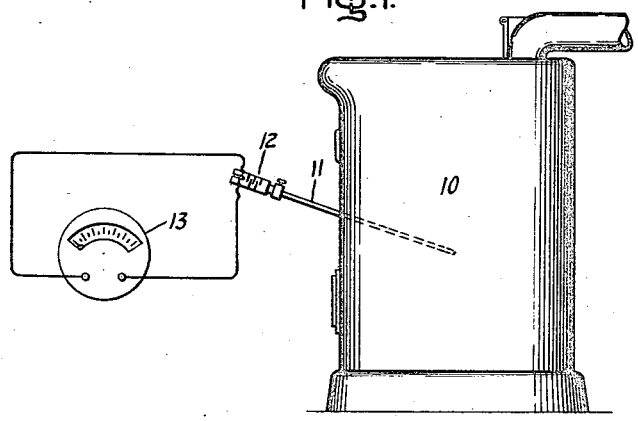
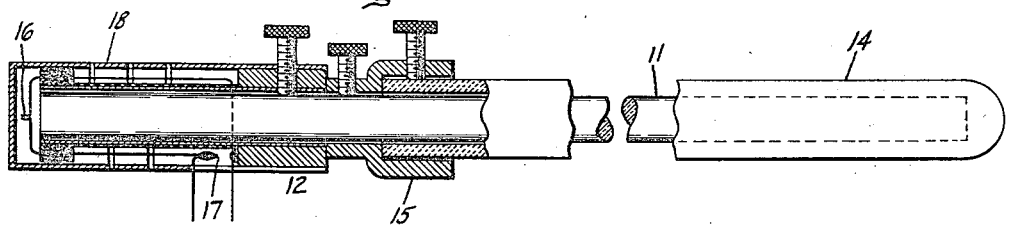
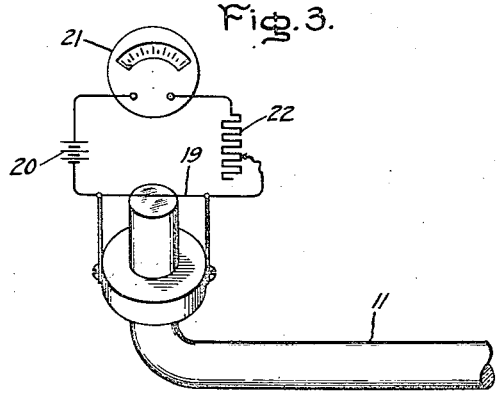
Inventor:
Fredrick S. Marcellus,
by Charles E. Tullar
His Attorney.

Patented Jan. 10, 1933

1,894,109

UNITED STATES PATENT OFFICE

FREDRICK S. MARCELLUS, OF SCOTIA, NEW YORK, ASSIGNOR TO GENERAL ELECTRIC COMPANY, A CORPORATION OF NEW YORK

TEMPERATURE MEASUREMENT

Application filed November 19, 1930. Serial No. 496,742.

My invention relates to inexpensive but reliable temperature measuring and indicating apparatus, particularly suitable for use over a temperature range from about 500 to 1100 degrees centigrade. In this invention I make use of the radiant energy ray conducting property of quartz rods. In one form of the invention a quartz rod is used as a heat ray conductor between the heat source and a thermocouple. In another form use is made of a quartz rod to convey light rays from the source of heat to an adjustable color comparing device calibrated to obtain temperature measurements.

The features of my invention which are believed to be novel and patentable will be pointed out in the claim appended hereto. For a better understanding of the invention reference is made in the following description to the accompanying drawing which illustrates in Fig. 1 the application of my invention for determining the temperature in the interior of a furnace; Fig. 2 shows the invention using a thermocouple at the outer end of the quartz rod, and Fig. 3 shows the invention using a color comparison outfit at the outer end of the quartz rod.

In Fig. 1, 10 represents a furnace the interior temperature of which it is desired to measure. 11 represents a quartz rod having one end exposed to the furnace temperature and the other end extending out of the furnace to a thermocouple unit 12 to which is connected a sensitive electric measuring instrument 13 which may be calibrated with the apparatus in temperature units.

Fig. 2 shows a more detailed view of a preferred construction of this temperature measuring unit. As is well known a rod of clear fused quartz such as is shown at 11 will convey radiant energy such as heat and light rays with remarkable efficiency for considerable distances even though the rod may be bent as shown in Fig. 3. If one end surface of such a rod is exposed to heat or light, heat or light rays will be given out from the other end. If heat or light is applied at an intermediate portion of the rod the above described phenomenon does not occur. The phenomenon is due to the remarkable interval ray reflecting power of the quartz rod. Thus heat and light rays will enter one end of the rod and be emitted at the other end with remarkable efficiency. If the right hand end of rod 11 is thus exposed to heat rays a thermocouple or other heat sensitive device at the other end will be influenced in proportion to the temperature at the hot end of the rod. In practice I have found it advisable to place a heat resisting refractory protective covering 14 over that portion of the rod in the furnace. This keeps the end clean without preventing heat rays from entering the end surface of the rod. The outer end is preferably provided with a brass housing 15 for holding covering 14 in place and serving as a support for the thermocouple. The hot junction of the thermocouple is shown at 16 closely adjacent the outer end surface of the quartz rod and within the protective housing. The cold ends of the thermocouple are represented at 17 secured to leads for connection to the measuring instrument. The shell-like casing indicated at 18 carries the thermocouple leads suitably insulated. This shell is preferably provided with ventilating openings as shown. Only one thermocouple is represented but in accordance with the usual practice any number of thermocouples may be connected in series, all having their hot junctions exposed to the heat rays emitted from the end of the rod. The particular arrangement in this respect will depend upon the sensitivity of the measuring instrument employed. When I speak of a thermocouple I therefore intend to include any well known combination of thermocouples. This particular modification I have found may be used to measure and indicate temperatures at the hot end of the rod ranging from about 500 to 1100 degrees centigrade with good accuracy.

In the arrangement shown in Fig. 3 the furnace end of the quartz rod is not shown but it will be protected and kept clean as in Fig. 2. When the refractory material adjacent the hot end of the rod is heated between certain temperature limits it changes in color. It is a dull red at one temperature and becomes brighter as the temperature increases. The change in color for the purpose in question occurs over a temperature range from about 700 to 1100 degrees centigrade.

The opposite or cold end of the rod will glow with the same color and give a rough indication of temperature. However, much more accurate results are obtained by the color comparison scheme represented in Fig. 3. Here a fine wire conductor 19 is placed closely adjacent the cold end of the rod 11 and supported there by the arrangement shown. This wire is connected in series with a source of supply 20, a measuring instrument 21 and an adjustable resistance 22. The wire is heated by the electric current and the latter is adjusted until the color of the wire and end surface of the rod 11 are the same. The instrument then gives an indication proportional to the hot end temperature and after careful calibration of the apparatus over the color range available, fairly good results may be obtained.

The arrangements described are advantageous in that all of the electrical apparatus used is outside the furnace while those parts exposed to the high temperatures are of a rugged, heat resisting character.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is,—

Temperature measuring apparatus comprising a quartz rod, a refractory covering over one end of said rod, a ventilated casing over the opposite end of said rod, means for securing said covering and casing to the rod, a thermocouple supported in said casing with its hot junction adjacent the end surface of the rod and a current responsive device connected to said thermocouple.

In witness whereof, I have hereunto set my hand this 18th day of November, 1930.

FREDRICK S. MARCELLUS.